Jan. 13, 1953 G. ALMQUIST 2,625,097
HAY BALER SLEEVE
Filed March 14, 1951 3 Sheets-Sheet 1
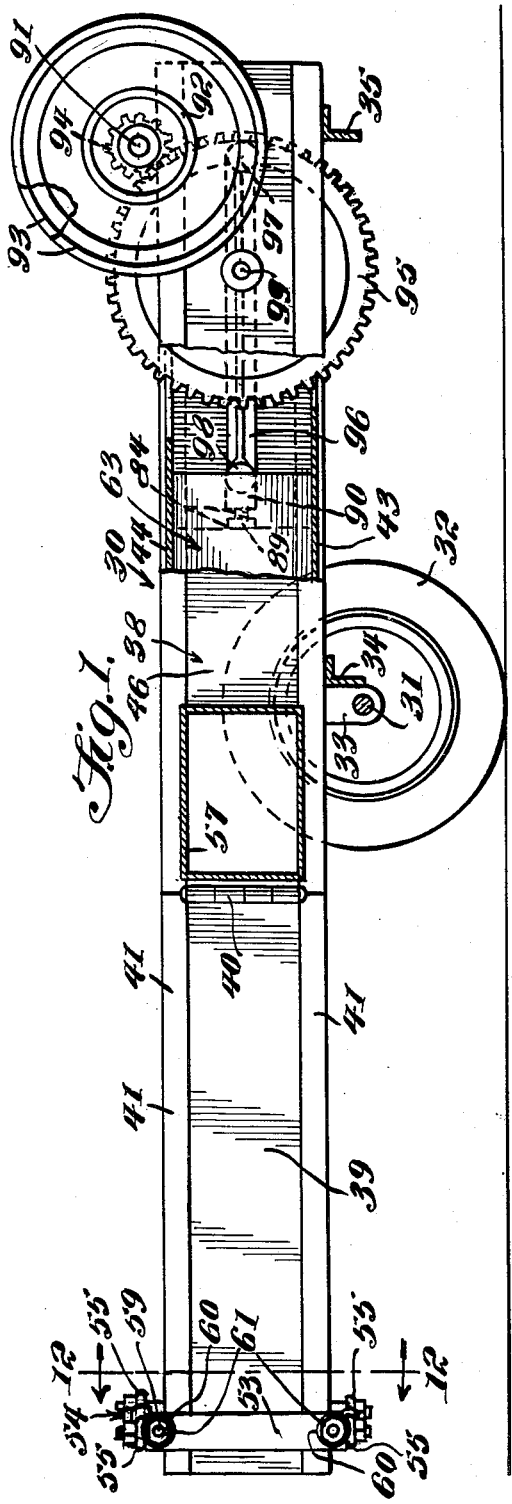
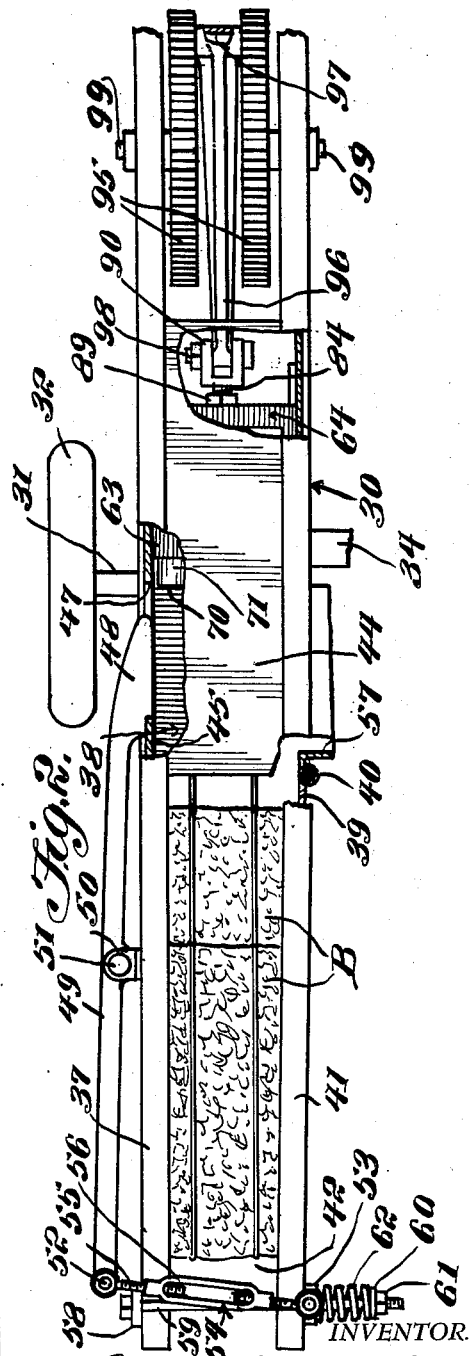
INVENTOR.
Gus Almquist,
BY Victor J. Evans & Co.
ATTORNEYS

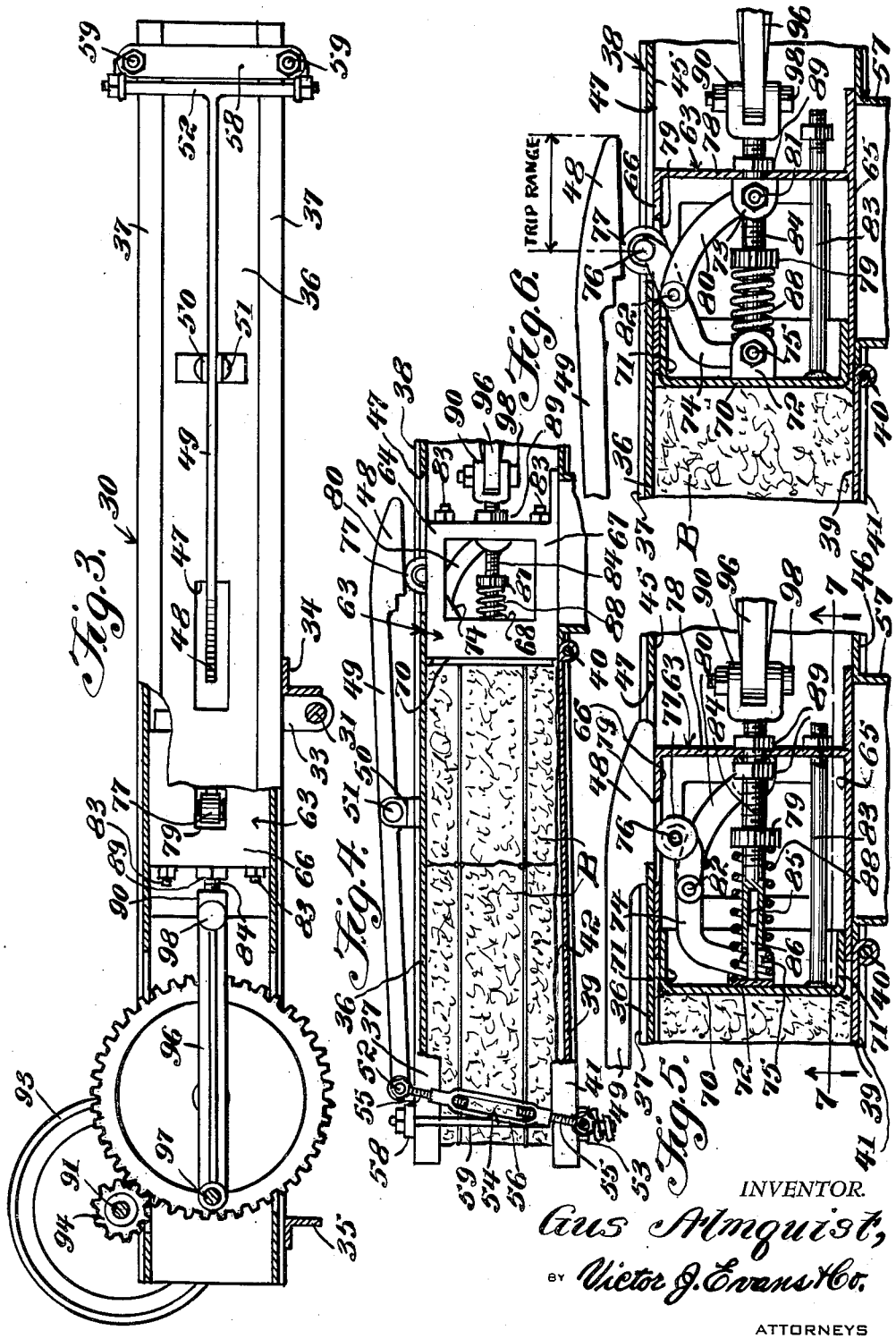

Jan. 13, 1953
G. ALMQUIST
2,625,097
HAY BALER SLEEVE
Filed March 14, 1951
3 Sheets-Sheet 3
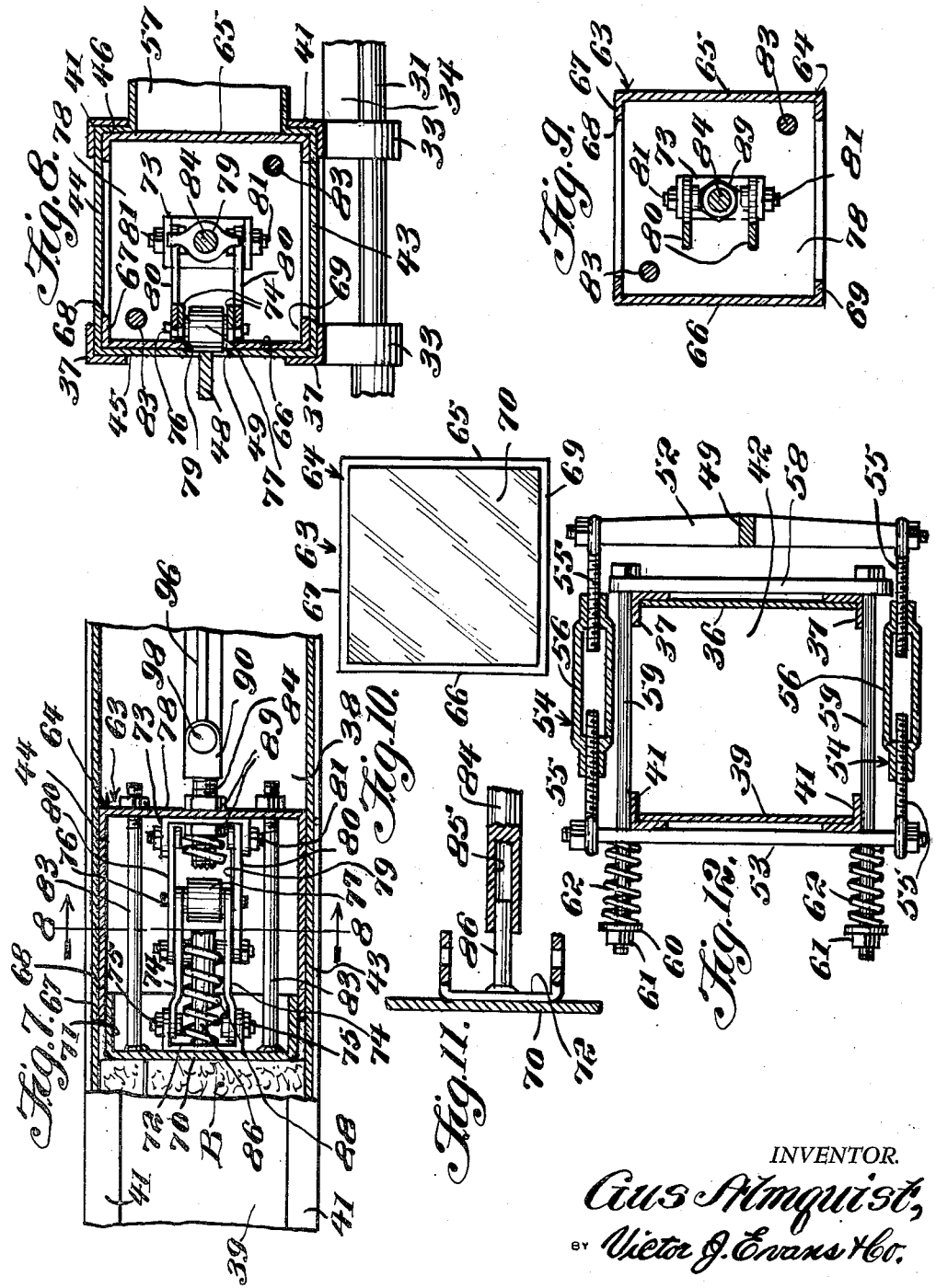
INVENTOR.
Gus Almquist,
BY Victor J. Evans & Co.
ATTORNEYS Patented Jan. 13, 1953

2,625,097

UNITED STATES PATENT OFFICE 2,625,097

HAY BALER SLEEVE

Gus Almquist, Riverside, Calif.

Application March 14, 1951, Serial No. 215,404

5 Claims. (Cl. 100—192)

This invention relates to agricultural equipment, and more particularly to a hay or straw harvesting and baling machine.

The object of the invention is to provide a hay or straw baling machine which is constructed so that in the event excessive pressure prematurely builds up between the plunger and bales of straw or hay, the back of the machine will quickly and automatically open to permit discharge of the baled hay, whereby damage to the machine will be prevented and whereby there will be no "choking up" to cause a delay in the harvesting operations.

Another object of the invention is to provide a hay or straw baling machine which is ruggedly constructed and adjustable as desired, whereby in the event the reciprocating plunger encounters too much resistance or pressure from the baled hay, the back end of the machine will automatically be opened to safely permit discharge of the baled hay.

A further object of the invention is to provide a baling machine which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the hay or straw baling machine according to the present invention, and with parts broken away and in section;

Figure 2 is a top plan view of the machine of the present invention, with parts broken away and in section;

Figure 3 is a side elevational view looking at the side opposite from Figure 1, with parts broken and in section;

Figure 4 is a fragmentary top plan view showing the position of the parts when in their open position to permit the baled hay to drop out of the rear of the machine;

Figures 5 and 6 are fragmentary, horizontal, sectional views showing different positions of the plunger and trip mechanism;

Figure 7 is a fragmentary side elevational view of the plunger, with parts broken away and in section;

Figure 8 is a sectional view taken on the line 8—8 of Figure 7;

Figure 9 is a sectional view taken through the plunger;

Figure 10 is a front elevational view of the plunger;

Figure 11 is a detail sectional view of the connection between the bracket and shaft;

Figure 12 is a sectional view taken on the line 12—12 of Figure 1.

Referring in detail to the drawings, the numeral 30 designates the straw baling machine which may be made of any suitable material, and the frame of the machine 30 is supported by ground-engaging wheels 32, Figure 1, the wheels 32 being mounted on a horizontally disposed axle 31. The framework is connected to the axle 31 by means of ears 33, and angle irons 34 and 35 are secured beneath the vehicle or framework, whereby a conventional straw pickup mechanism can be attached and used with the baling machine of the present invention.

The baling machine includes a vertically disposed first plate 36 which has a pair of angle irons 37 secured thereto, as by welding, Figures 2 and 12. Secured to the first plate 36 in any suitable manner, as by welding, is a housing 38, and a second vertically disposed plate 39 is hingedly connected to the housing 38 by means of a hinge 40, Figure 2. Thus, the plate 39 can pivot or swing about a vertical axis extending through the hinge 40. An angle iron 41 is secured to each of the upper and lower edges of the plate 39, and the pair of plates and their corresponding angle irons cooperate to define a passageway or chamber 42 through which the bales of straw B pass. The housing 38 is provided with a horizontally disposed top wall 44, Figure 7, and arranged in spaced parallel relation below the top wall 44 is a bottom wall 43. The housing 38 is further provided with vertically disposed, spaced, parallel side walls 45 and 46. The side wall 45 is provided with a cutout or opening 47, Figures 5, 6 and 8, and an end portion 48 of a lever 49 is arranged in registry with the opening 47 for a purpose to be later described. The lever 49 is pivotally mounted between a pair of ears 50 by means of a pin 51, the ears 50 being secured, as by welding, to the plate 36, the plate 36 terminating in the wall 45.

Secured to the rear end of the lever 49 and arranged transversely with respect thereto is a bar 52, Figure 12. A vertically disposed arm 53 is secured, as by welding, to the angle irons 41 which are connected to the plate 39. A pair of spaced, parallel, horizontally disposed turnbuckle assemblies 54 serve to connect the arm 53 to the bar 52. Each of the turnbuckle assemblies 54 includes a pair of screw members 55 which pivotally engage the arm 53 and bar 52. The pair of screw members 55 rotatably or threadedly engage a shell 56. Initially, when the tripping mechanism is being set, the shell 56 can be rotated manually in order to insure that the mechanism trips at the desired time.

Extending from one side of the housing 38 and secured thereto is a hopper 57, Figure 5. The hopper 57 provides a means for loading the machine with hay or straw, and the straw or hay can be loaded either by hand or by a conventional loading machine.

A means is provided for maintaining the proper tension on the bales of hay B so as to insure that the machine functions properly. This means comprises a brace 58 which is vertically disposed and which is secured to the rear ends of the angle irons 37, Figures 4 and 12. A pair of spaced, parallel, horizontally disposed rods 59 extend through the brace 58 and through the arm 53, and a washer 60 is arranged on one end of each of the rods 59. A nut 61 is arranged in threaded engagement with the ends of the rods 59 adjacent the washers 60 for maintaining the parts in assembled relation, and a coil spring 62 is circumposed on each of the rods 59. The coil springs 62 serve to normally urge the plate 39 toward the plate 36 so that proper pressure will be maintained on the bales of hay B during the baling operations, as shown in Figure 2.

Mounted for sliding or reciprocatory movement in the housing 38 is a plunger 63, Figure 6. The plunger 63 includes a casing 64, and the casing 64 comprises a pair of spaced, parallel vertically disposed side members 65 and 66. The casing 64 of the plunger 63 further includes a horizontally disposed top member 67 which is provided with a cutout 68, Figure 4, whereby access can be had to the interior of the plunger in order to adjust the parts therein. A horizontally disposed bottom member 69 is arranged in spaced, parallel relation below the top member 67. Mounted for sliding movement in the casing 64 is a head 70, and the head 70 is provided with inturned, transverse flanges 71 which insure a tight fit between the pressure head 70 and the casing 64. Secured to the inner surface of the pressure head 70 is a first U-shaped bracket 72, while secured to the back member 78 of the casing 64 is a second U-shaped bracket 73. A first pair of spaced, parallel links 74 are pivotally connected to the first bracket 72 by pins or bolt-and-nut assemblies 75, and extending between the outer ends of the pair of links 74 is a pin 76 which serves to support thereon a roller 77. The roller 77 is engaged by or engages the end portion 48 of the lever 49 when pressure exceeds a predetermined amount on the straw bales, so as to trip the lever 49 and permit the plate 39 to pivot, whereby the bales of straw or hay can be discharged. The roller 77 is adapted to move through a cutout or opening 79 in the side member 66. A second pair of links 80, Figures 5 and 6, are pivotally connected to the second bracket 73 by means of bolt-and-nut assemblies 81, and the outer ends of the links 80 are pivotally connected to the links 74 by means of bolt-and-nut assemblies 82. For guiding the pressure head 70 during its sliding movement, guide pins or rods 83 have one end secured to the inner surface of the pressure head 70, and the other ends of the pins or rods 82 slidably project through the back member 78 of the casing 64.

Extending through the back member 78 is an exteriorly threaded shaft 84, and the shaft 84 is provided with a socket 85 in one end thereof, Figure 5. A guide pin 86 projects from the first bracket 72 and slidably seats in the socket 85. Arranged in threaded engagement with the shaft 84 is a stop nut 87, and a coil spring 88 is circumposed on the shaft 84 and interposed between the nut 87 and the bracket 72. Arranged on each side of the back member 78 and threadedly engaging the shaft 84 is a pair of lock nuts 89, and secured to the front end of the shaft 84 is a bushing 90.

The machine is further provided with a means for causing reciprocatory sliding movement of the plunger 63. This means comprises a horizontally disposed shaft 91 which has a pulley 92 mounted thereon. A suitable belt (not shown) is adapted to be trained over the pulley 92, and the belt may be driven from a tractor, or any other power source, such as a gasoline engine. Also mounted on the shaft 91 are flywheels 93, and small gears 94, which mesh with large gears 95, the large gears 95 being mounted on stud shafts 99, Figures 1 and 2. A crank pin 97 extends between the pair of large gears 95 and is arranged off center, and a rod or arm 96 has one end pivotally connected to the crank pin 97 and its other end pivotally connected by means of a pin 98 to the bushing 90 which is arranged on the front end of the shaft 84.

From the foregoing, it is apparent that a baling machine has been provided wherein hay, straw, corn stalks and other roughage grown on the farm can be quickly and economically baled. The means for tying the wires around the bales of straw or hay are not shown, since any conventional tying means can be used. Power may be supplied for operating the machine either from a tractor or from an auxiliary engine. Thus, a belt driven by a power source may be trained over a pulley 92 for causing a reciprocation of the plunger. When the machine is driven by a tractor, it is adapted for stationary operation, and when it is operated by a gasoline auxiliary engine, it is adapted for mobile baling operations. Also, any suitable feeding mechanism may be used for feeding the hay or straw through the hopper 57 into the machine. The plunger 63 which is actuated by the pitman or rod 96 compresses each charge by forcing it into the bale chamber 42. Thus, the pulley 92 is rotated to thereby rotate the shaft 91, and this causes rotation of the flywheel 93, small gears 94 and consequently the large gears 95. The large gears 95 are mounted on the stud shafts 99, and rotation of the gears 95 causes the arm 96 to be reciprocated so that the plunger 63 will move back and forth in the housing 38. As the plunger 63 moves back and forth, the charge of straw or hay is compressed and forced into the bale chamber. Loose hay or straw is fed into the housing 38 through the feed hopper 57, and this material to be baled can either be fed by machine or by hand. After the straw is formed in bales, it drops out the back of the machine, the bales of straw or hay being indicated by the letter B. The bales of straw or hay are formed in the baling chamber 42 which is formed by the pair of vertically disposed plates 39 and 36 and their associated angle irons. Normally, these plates occupy the positions shown in Figure 2, and it will be seen that the side plates 39 can swing about the hinge 40. The proper amount of tension is applied to the side plates 39 by means of the springs 62 which are mounted on the rods 59. Thus, the springs 62 serve to urge the plates 39 toward the stationary plate 36.

By adjusting the tension on the springs 62 by means of the nut 61, the compactness of the bale B being formed can be regulated. As the plunger 63 works back and forth, the straw or hay is continually compressed and baled, but occasionally the pressure builds up excessively in the baling chamber 42. If this happens, the pressure head 70 will be moved back into the casing 64 of the plunger 63. Thus, the pressure head 70 will move from the position shown in Figure 5 to the position shown in Figure 6, and this inward movement of the pressure head 70 will cause the links 74 and 80 to pivot to thereby cause the roller 77 to move out of the opening in the side of the housing 38. As the roller 77 moves out of the housing, it pivots the lever 49 about the pin 51 in a counterclockwise direction, as shown in Figure 4, so that the pair of turnbuckle assemblies 54 will move the rear end of the plate 39 away from the stationary plate 36 and permit the bale B to drop out of the rear end of the machine. Thus, "choking up" will be prevented and there will be no delay in baling operations, nor will there be any damage to the machinery as a result of excessive pressure building up in the baling chamber. During the return stroke of the plunger 63, or after the straw bales B have dropped out of the rear end of the baling chamber, the pressure on the head 70 will be relieved so that the head 70 will move from the position shown in Figure 6 back to the position shown in Figure 5, and also, the roller 77 will be withdrawn into the housing 38 so that normal baling operations can be continued. The turnbuckle assemblies 54 can be initially adjusted in order to properly set the position of the plate 39 in order to insure that the plate 39 pivots at the desired time. The tripping mechanism incorporated in the apparatus operates quickly and automatically. In Figure 2, the parts are shown in their normal positions, so that bales of straw B are formed between the plates 39 and 36, while in Figure 4, the plate 39 is shown in its tripped or open position so as to permit the bales B to drop out of the rear end of the machine when excessive pressure builds up in the chamber 42.

What is claimed is:

1. In a mobile straw baling machine, a housing, a plunger reciprocably mounted in said housing and adapted to be reciprocated by a power source, a feed hopper projecting from one side of said housing for the ingress therethrough of straw to be baled, a first vertically disposed stationary plate extending rearwardly from said housing, a second plate hingedly connected to said housing and arranged in spaced relation with respect to said first plate, said plates coacting to define a baling chamber, means connecting the free ends of said plates together, and a trip mechanism for selectively permitting pivotal movement of said second plate away from said first plate, said trip mechanism comprising a lever pivotally connected to said first plate, a roller carried by said plunger for engaging one end of said lever, an arm secured to said second plate, a bar secured to said lever, and turnbuckle assemblies extending between said bar and said arm.

2. The apparatus as described in claim 1, wherein said means embodies a pair of rods extending between said pair of plates, and coil springs circumposed on said rods for maintaining the proper tension on the straw being baled.

3. The apparatus as described in claim 1, wherein said plunger includes a casing, and a pressure head movably mounted in said casing.

4. In a straw baling machine, a first vertically disposed plate having angle irons secured thereto, a housing secured to said plate, a feed hopper projecting from one side of said housing for the ingress therethrough of straw to be baled, a second vertically disposed plate having angle irons secured thereto and having one end hingedly connected to said housing, said plates providing a baling chamber for slidably supporting the straw, a vertically disposed arm secured to the free end of said second plate, a pair of spaced parallel horizontally disposed turnbuckle assemblies adjustably connected to said arm, a lever pivotally connected to the outer surface of said first plate, a bar secured to said lever and pivotally connected to said turnbuckle assemblies, a plunger reciprocably arranged in said housing, there being openings in said housing and said plunger, said plunger comprising a casing provided with a vertically disposed back member, a head slidably mounted in said casing, a first U-shaped bracket secured to said head, a threaded shaft extending through said back member and provided with an internal socket in one end thereof, a guide pin projecting from said bracket for engaging said socket, an adjusting nut mounted on said shaft, a coil spring circumposed on said shaft and interposed between said adjusting nut and said first bracket for normally urging said pressure head away from said back member, a second U-shaped bracket secured to the inner surface of said back member, a first pair of links pivotally connected to said first bracket, a second pair of links pivotally connected to said second bracket and to said first pair of links, and a roller supported by said first pair of links.

5. In a straw baling machine, a first vertically disposed plate having angle irons secured thereto, a housing secured to said plate, a feed hopper projecting from one side of said housing for the ingress therethrough of straw to be baled, a second vertically disposed plate having angle irons secured thereto and having one end hingedly connected to said housing, said plates providing a baling chamber for slidably supporting the straw, a vertically disposed arm secured to the free end of said second plate, a pair of spaced parallel horizontally disposed turnbuckle assemblies adjustably connected to said arm, a lever pivotally connected to the outer surface of said first plate, a bar secured to said lever and pivotally connected to said turnbuckle assemblies, a plunger reciprocably arranged in said housing, there being openings in said housing and said plunger, said plunger comprising a casing provided with a vertically disposed back member, a head slidably mounted in said casing, a first U-shaped bracket secured to said head, a threaded shaft extending through said back member and provided with an internal socket in one end thereof, a guide pin projecting from said bracket for engaging said socket, an adjusting nut mounted on said shaft, a coil spring circumposed on said shaft and interposed between said adjusting nut and said first bracket for normally urging said pressure head away from said back member, a second U-shaped bracket secured to the inner surface of said back member, a first pair of links pivotally connected to said first bracket, a second pair of links pivotally connected to said second bracket and said first pair of links, and a roller supported by said first pair of links, said roller being engaged by said lever whereby when the pressure on the straw being baled exceeds a predetermined amount, the head will move into the casing to raise the roller, pivot the lever and cause the second plate to swing away from the first plate whereby the baled straw can drop out of the rear of the machine.

GUS ALMQUIST.

REFERENCES CITED

The following references are of record in the file of this patent:

UNITED STATES PATENTS

| Number | Name | Date |
| --- | --- | --- |
| 358,898 | Sooy | Mar. 8, 1887 |
| 362,884 | Ertel | May 10, 1887 |
| 1,065,648 | Wygant | June 24, 1913 |
| 1,333,068 | Evans et al. | Mar. 9, 1920 |